No. 620,728. Patented Mar. 7, 1899.
T. BABIN.
WATER SPRINKLER.
(Application filed Nov. 30, 1898.)
(No Model.)
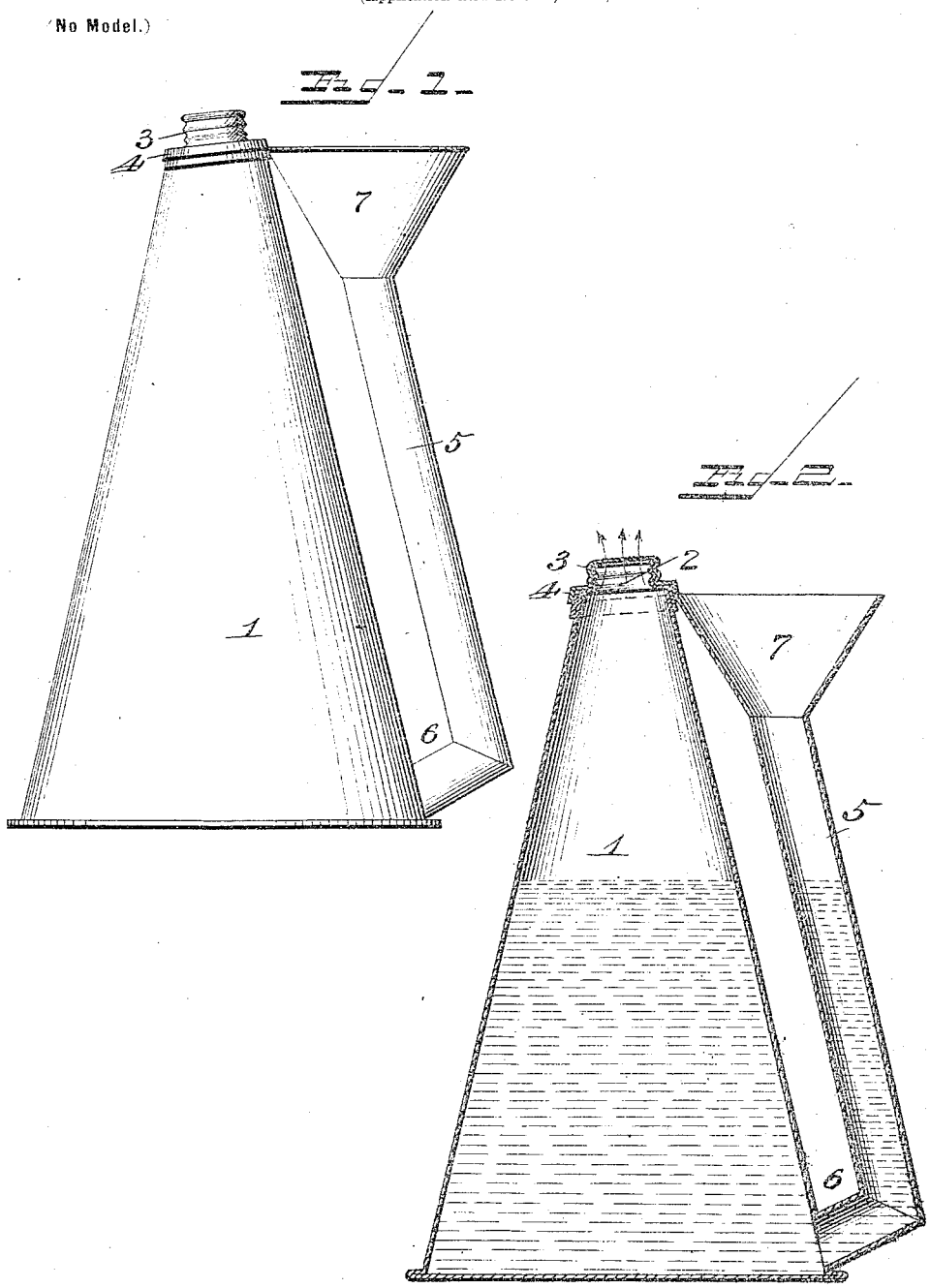
Witnesses:
Franck L. Ourand
Jos. L. Coombs
Inventor:
Telesphore Babin,
Lewis Bagger & Co.
Attorneys

UNITED STATES PATENT OFFICE.

TELESPHORE BABIN, OF HOUMA, LOUISIANA.

WATER-SPRINKLER.

SPECIFICATION forming part of Letters Patent No. 620,728, dated March 7, 1899.

Application filed November 30, 1898. Serial No. 697,863. (No model.)

*To all whom it may concern:*

Be it known that I, TELESPHORE BABIN, a citizen of the United States, residing at Houma, in the parish of Terre Bonne and State of Louisiana, have invented new and useful Improvements in Water-Sprinklers, of which the following is a specification.

My invention relates to water-sprinklers for use in stores, houses, gardens, and other places; and its object is to provide an improved construction of the same by which I secure important advantages with respect to efficiency in use.

My invention consists in a conical water-receptacle having a removable nozzle at the upper end formed with a number of perforations and an inclined filling-tube which also serves as a handle and an air-vent and connected with the lower end of said receptacle by a short inclined pipe and provided with a funnel at the upper end, as hereinafter fully described and claimed.

In the accompanying drawings, Figure 1 is a side elevation of a water-sprinkler constructed in accordance with my invention. Fig. 2 is a central longitudinal section of the same.

In the said drawings, the reference-numeral 1 designates a conical water-receptacle provided at the apex or upper end with a screw-threaded cap 2, with which engages a correspondingly-threaded perforated nozzle 3. This nozzle is removable and at its inner end is formed with a flange 4, so as to make a tight joint when the nozzle is screwed in place on the cap.

The numeral 5 designates a filling-tube which is inclined to correspond with the conical shape of the receptacle, so as to be at the same distance therefrom throughout its length. At the lower end said tube is connected with the said receptacle by a short downwardly-inclined pipe 6, while at its upper end it is provided with a funnel 7 for facilitating the operation of filling the receptacle. This funnel is secured to the upper end of the receptacle.

The operation will be readily understood. The receptacle is filled through the funnel, filling-tube, and short inclined pipe, and when it is desired to use the device the said tube, which serves as a handle, is grasped and the receptacle tilted, when the water will be discharged through the perforated nozzle in a number of fine streams. The said filling-tube also serves as an air-vent to allow the water to be readily discharged from the receptacle.

By making the water-receptacle conical, as shown, the water will be discharged with facility, as there will be nothing to interfere with or obstruct its flow to the nozzle when the receptacle is tilted.

Having thus fully described my invention, what I claim is—

1. In a water-sprinkler, the combination with the conical water-receptacle, provided with a perforated nozzle at the upper end, of the filling-tube connected with the lower end of said receptacle and inclined at an angle corresponding with the shape of said receptacle, and also serving as a handle and an air-vent, and the funnel at the upper end of said tube, substantially as described.

2. In a water-sprinkler, the combination with the conical water-receptacle having a screw-threaded cap at the upper end and the removable perforated nozzle connected therewith, of the inclined filling-tube inclined at an angle corresponding with the slope of said receptacle, the short downwardly-inclined pipe connected with the lower ends of said tube and receptacle, and the funnel at the upper end of said tube, substantially as described.

In testimony whereof I have hereunto set my hand in presence of two subscribing witnesses.

TELESPHORE BABIN.

Witnesses:
Q. C. MOÏSE,
JAMES A. DAVIS.